(12) United States Patent
Gere

(10) Patent No.: US 7,404,091 B1
(45) Date of Patent: Jul. 22, 2008

(54) METHODS, SYSTEMS, AND COMPUTER PROGRAM PRODUCTS FOR MANAGING POWER ALLOCATION TO A DEVICE POWERED OVER A NETWORK COMMUNICATIONS CABLE BASED ON A CABLE CHARACTERISTIC

(75) Inventor: David S. Gere, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 394 days.

(21) Appl. No.: 11/086,856

(22) Filed: Mar. 22, 2005

(51) Int. Cl.
*G06F 1/00* (2006.01)

(52) U.S. Cl. .................................. 713/300; 713/320

(58) Field of Classification Search .............. 703/300; 31/300
See application file for complete search history.

(56) References Cited

U.S. PATENT DOCUMENTS

| | | | |
|---|---|---|---|
| 5,128,619 A * | 7/1992 | Bjork et al. ............... | 324/533 |
| 5,754,943 A * | 5/1998 | Arai et al. ................ | 455/14 |
| 6,448,899 B1 | 9/2002 | Thompson | |
| 6,535,983 B1 | 3/2003 | McCormack et al. | |
| 6,597,183 B1 | 7/2003 | Male | |
| 6,608,264 B1 | 8/2003 | Fouladpour | |
| 2003/0122551 A1 | 7/2003 | Male | |
| 2004/0230846 A1 | 11/2004 | Mancey et al. | |
| 2004/0251912 A1 * | 12/2004 | Pharn et al. ............... | 324/534 |
| 2005/0262364 A1 * | 11/2005 | Diab et al. ................ | 713/300 |

OTHER PUBLICATIONS

Foskett, Stephen. 'Stephen Foskett's Power over Ethernet Calculator Version 1.01.' http://www.gweep.net/~sfoskett/tech/poecalc.html. Jun. 21, 2003.*
Posey, "New Uses for 802.3af Devices on Your Network," http://techrepublic.com. com/5100-22-5489184.html, pp. 1-4 (Dec. 21, 2004).
"Power Over Ethernet: Cisco Inline Power and IEEE 802.3af," Cisco Systems, Inc., pp. 1-13 (2004).
"IEEE Standards 802.3af," IEEE, pp. 1-132 (Jun. 18, 2003).
"802.3af Requirements", IEEE, pp. 1-2 (2000).

* cited by examiner

*Primary Examiner*—Thomas C Lee
*Assistant Examiner*—Jaweed A Abbaszadeh
(74) *Attorney, Agent, or Firm*—Jenkins, Wilson, Taylor & Hunt, P.A.

(57) ABSTRACT

Methods, systems, and computer program products for managing power allocation to a device powered over a communications cable based on a cable characteristic are disclosed. In one example, a method of managing power allocation to a device powered over a communications cable can include providing a power source for connecting to a powered device via a communications cable. An anticipated power loss of the device is determined. A characteristic of the cable is determined. Power allocated to the device is then set based on the anticipated power consumption and the characteristic.

36 Claims, 2 Drawing Sheets

METHODS, SYSTEMS, AND COMPUTER PROGRAM PRODUCTS FOR MANAGING POWER ALLOCATION TO A DEVICE POWERED OVER A NETWORK COMMUNICATIONS CABLE BASED ON A CABLE CHARACTERISTIC

TECHNICAL FIELD

The subject matter disclosed herein relates to managing power allocation to a device powered over a communications cable. More particularly, the subject matter disclosed herein relates to methods, systems, and computer program products for managing power allocation to a device powered over a network cable based on a cable characteristic.

BACKGROUND ART

Network devices typically communicate via communications cables and receive power from separate power cables. For example, a personal computer (PC) may exchange Ethernet frames with an Ethernet switch via an Ethernet cable and receive power from a power source via a separate power cable. In order to eliminate the need for a separate power cable, efforts have been made to utilize network connections, such as an Ethernet cable, for providing power to the end network device.

The Institute of Electrical and Electronics Engineers (IEEE) has defined a method for powering end network devices through an Ethernet cable. Particularly, in the IEEE 802.3af standard (also known as the Power over Ethernet (PoE) standard), the IEEE has defined methods by which power source equipment (PSE) power Ethernet-connected powered devices (PDs) over an Ethernet cable. The IEEE 802.3af standard defines how a PD is detected and methods of delivering power to the PD over an Ethernet cable.

The IEEE 802.3af standard specifies power levels that the PSE must supply to different classes (i.e., classes 0, 1, 2, 3, and 4) of PDs. For example, the IEEE 802.3af standard specifies that the PSE must reserve at least 15.4 watts (W) for a class 3 PD. However, the 802.3af standard specifies that a class 3 PD must consume no more than 12.95 W. The reason that the 802.3af standard requires 15.4 W to be reserved to power a 12.95 W device is that the standard requires the PSE to provide enough power for worst-case power loss between the PSE and the PD. Requiring worst-case power reservation at the PSE for every device connected to the PSE limits the number of devices that can be powered by the PSE.

Accordingly, there exists a need for methods, system, and computer program products for efficiently managing the power allocated to a device powered over a communications cable.

SUMMARY

According to one aspect, the subject matter described herein comprises methods, systems, and computer program products for managing power allocation to a device powered over a communications cable, such as a network communications cable. One method can include providing a power source for powering a powered device via a communications cable. Further, the method can include determining an anticipated power consumption the powered device. The method can also include determining a characteristic of the cable. Further, the method can include allocating a predetermined amount of power to the powered device based on the anticipated power consumption of the powered device and the characteristic of the cable.

BRIEF DESCRIPTION OF THE DRAWINGS

Preferred embodiments of the subject matter described herein will now be explained with reference to the accompanying drawings of which.

DETAILED DESCRIPTION

Methods, systems, and computer program products for managing power allocation to devices powered over communications cables may be implemented in any suitable network communications device, such as an Ethernet switch, a bridge, a router, or a repeater. The subject matter described herein can efficiently allocate power to powered devices (PDs) over communications cables. According to one embodiment, the subject matter described herein can base power allocation on a characteristic of the communications cable that transports power to each powered device. The subject matter described herein can also base power allocation on anticipated device power consumption. By allocating power based on anticipated power consumption of a powered device and a characteristic of the communications cable that connects the device to the power source equipment, power allocation is more efficient than worst-case power allocation methods. As a result, the number of devices that can be powered by a single power supply is increased.

Figure 1:
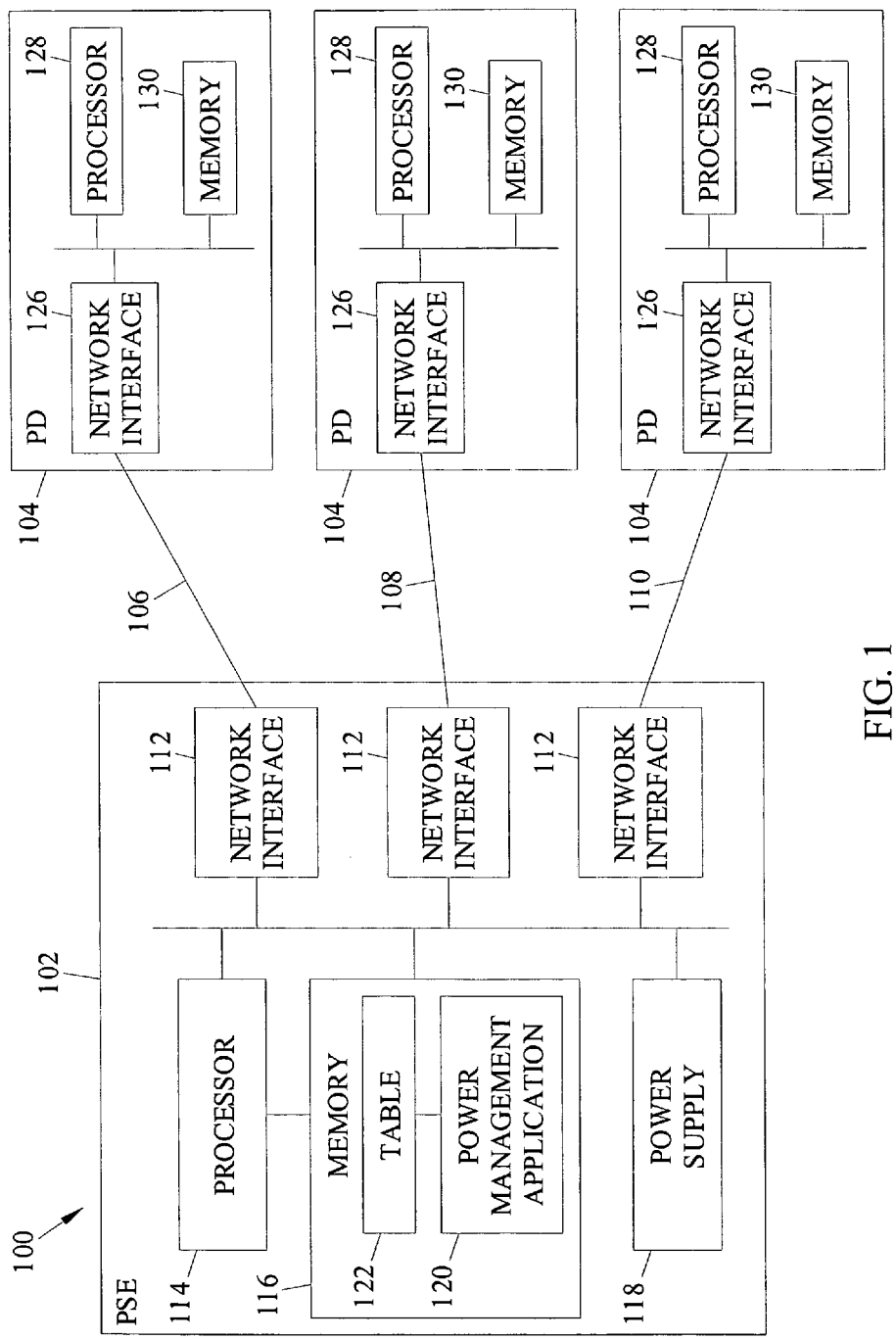
FIG. 1 is a schematic diagram illustrating an exemplary system for managing power allocation from power source equipment to a powered device over a communications cable according to an embodiment of the subject matter described herein.

FIG. 1 is a schematic diagram illustrating an exemplary system (generally designated 100) for efficiently allocating power from power source equipment (PSE) 102 to PDs 104 over communications cables 106, 108, and 110 according to the methods and systems described herein. PSE 102 may be a hub, router, bridge, repeater, switch, or another suitable device configured to communicate data and power to PDs 104 over cables 106, 108, and 110. For example, system 100 may be Power over Ethernet system or another suitable system operable to transmit power over communications cables 106, 108, and 110. PDs 104 may be any suitable devices for receiving power and communicating data over communications cables 106, 108, and 110. Examples of such devices include PoE devices, such as PoE-enabled computers, phones, wireless access points, routers, switches, bridges, etc. Cables 106, 108, and 110 may be any suitable cables for communicating data between PSE 102 and PDs 104 and for transferring power from PSE 102 to PDs 104.

In some implementations, cables 106, 108, and 110 may be of different lengths, materials, and/or gauges. As a result, the power dissipated over cables may differ due to different $I^2R$ losses of each cable length or type. If the 802.3af standard is strictly adhered to, PSE 102 must reserve sufficient power for worst-case power dissipation of each cable, independently of actual power length or type. The methods, systems, and computer program products described herein may include determining cable length and/or type, calculating estimated cable dissipation, and allocating power based on the estimated power dissipation. Because power allocated to each device is based on estimated cable dissipation, rather than worst-case power dissipation, the number of devices that can be powered by PSE 102 is increased.

In the illustrated example, PSE 102 includes a plurality of network interfaces 112, a processor 114, memory 116, and a power supply 118. Network interfaces 112 are connected to cables 106, 108, and 110 for communicating with and providing power to PDs 104. Processor 114 controls the components of PSE 102 for communicating data and power to PDs 104. Power supply 118 supplies power to PDs 104 via network interfaces 112.

Because power supply 118 has finite output power, it is desirable to allocate this power to PDs 104 as efficiently as possible. In order to accomplish this efficient power allocation, a power management application 120 may control power allocated to or reserved for each device based on at least one a cable characteristic, such as cable length, resistance, and temperature. In one implementation, power management application 120 may access a table 122 to determine the power to be allocated once the device type and cable length are known. Alternatively, power management application 120 may calculate cable power dissipation using a predetermined equation. Exemplary methods for determining cable length and estimating cable power dissipation will be described in detail below.

PDs 104 may each include a network interface 126, a processor 128, and a memory 130. Each network interface 126 is operable to receive and forward data to processor 128. In addition, each network interface 126 may receive power transmitted from PSE 102 via cables 106, 108, and 110. Processor 128 may control the components of PD 104 using programs stored in memory 130.

As stated above, power management application 120 can determine an amount of power to be allocated to each PD 104 based on estimated power consumption of each PD 104 and a cable characteristic. According to the 802.3af standard, PDs are be classified by the amount of power they consume. The IEEE 802.3af standard describes five power classes to which a PD may belong. Table 1 below is a summary of power classes specified by the IEEE 802.3af standard.

TABLE 1

IEEE 802.3af PSE and PD Power Classifications

| Class | Minimum Power Levels Output at the PSE | Maximum Power Level at the PD | Classification Current |
|---|---|---|---|
| 0 | 15.4 W | 0.44-12.95 W | <5.0 mA |
| 1 | 4.0 W | 0.44-3.84 W | 10.5 mA |
| 2 | 7.0 W | 3.84-6.49 W | 18.5 mA |
| 3 | 15.4 W | 6.49-12.95 W | 28 mA |
| 4 | Treat as Class 0 | Reserved for Future Use | 40 mA |

Referring to Table 1, for example, if a PD 104 is classified as a class 3 device, the IEEE 802.3af standard specifies that PSE 102 should allocate 15.4 W to cable 106 for powering PD 104. The 15.4 W is the worst-case power allocation. Instead of reserving this amount of power for a class 3 device, PSE 102 may reserve 12.95 W, the maximum power actually used by a class 3 device, plus an additional amount of power calculated based on a cable characteristic.

PSE 102 can determine the 802.3af class of each PD 104 based on a signature received from each PD 104. The signature of each PD 104 can be indicated by a current level transmitted from PD 104 on cable 106. Referring again to Table 1, the "Classification Current" column specifies the class associated with a current transmitted from each PD 104. For example, each PD 104 will transmit a classification current of 18.5 milliamps (mA) if the device is a class 3 device. The power consumed by each PD 104 may also be refined by simple network management protocol (SNMP) data received from each PD 104. Therefore, based on the SNMP data, PSE 102 can reduce the power that must be allocated to each PD 104. Alternatively, an operator can program PSE 102 with the 802.3af class of PD 104.

As stated above, power management application 120 can also determine an amount to be allocated to each PD 104 based on one or more cable characteristics. The characteristic can be any measurable aspect of the cable that affects the transmission of power on the cable. Exemplary cable characteristics affecting power transmission include cable length, resistance per unit length, and temperature. Other parameters that may be used in addition to cable characteristics include power loss due to connectors that connect PSE 102 and PD 104.

By accounting for the power loss due to characteristics of cables 106, 108, and 110 or other components for transmitting power, power management application 120 can efficiently allocate power to PD 104. For example, the IEEE 802.3af standard requires a PSE to supply up to 15.4 W for a class 3 device and limits power consumption by the PSE to no more than 12.95 W. This power difference is enough to support 23.86 ohms of resistance in the delivery of power from PSE 102 to PD 104. A 100 meter length of CAT-5 cable has a worst case resistance of 15.4 ohms when power is supplied as prescribed by IEEE standards. Experimental measurements of actual power over Ethernet equipment demonstrate that a connector can have approximately 0.8 ohms of resistance, and a current sensing resistor can have approximately 2.0 ohms of resistance.

Cable power dissipation varies depending on the cable type and length. Tables 2-4 show expected power dissipation of three typical cables. Table 2 shows power loss data for a 24 American Wire Gauge (AWG) cable having 9.4 ohms of resistance.

TABLE 2

Cable losses as a Function of Length and Power for 24 AWG Cable

| Class of PD | Current | Loss | Loss as a Percentage of PD Load |
|---|---|---|---|
| Class 1 = 3.84 W | 81 mA | 0.062 W | 1.6% |
| Class 2 = 6.49 W | 139 mA | 0.182 W | 2.8% |
| Class 3 = 12.95 W | 286 mA | 0.769 W | 5.9% |
| Undefined Class with 20.0 W load | 458 mA | 1.972 W | 9.9% |

The cable power dissipation in Tables 2-4 can be calculated as follows $$P_{PSE} = P_C + P_{PD} \quad (1)$$

$$V_{PSE} I = I^2 \times \frac{R}{L} \times L + P_{PD} \quad (2)$$

In Equation 1, $P_{PSE}$ is the power allocated to a PD at the PSE, $P_C$ is the power loss of the cable, and $P_{PD}$ is the power consumed by the powered device. In equation 2, $V_{PSE}$ is the voltage at the power source equipment, $$\frac{R}{L}$$

is the resistance per unit length of the cable, and L is the length of the cable. According to the 802.3af standard, the voltage at the power source equipment is nominally 48 volts. The resistance per unit length of the cable can be determined from the cable manufacturer's specifications. The length of the cable can be measured or input by the operator, as will be described in detail below. The power dissipated by the powered device can be assumed to be the maximum power consumption for each class of device according to the 802.3af standard. Since $V_{PSE}$, R, L, and $P_{PD}$ are constants. Equation 2 is a quadratic polynomial that can be solved using the quadratic formula or using iterative techniques.

For example, for the first entry in Table 2, the current value and power loss can be calculated as follows:

$$V_{PSE}I = I^2 \frac{R}{L} \times L + P_{PD}$$

$$(48V)I = I^2 \left(\frac{9.4\Omega}{100m}\right)(100m) + 3.84W$$

$$9.4I^2 - 48I + 3.84 = 0$$

$$I = \frac{48 \pm \sqrt{(-48)^2 - 4(9.4)(3.84)}}{2(9.4)}$$

$$I = \frac{48 \pm 46.47}{(2)(9.4)}$$

I=0.081, 5.025

Since I=5.025 amps is a trivial solution to the equation, the cable current, factoring in the cable loss, is 81 milliamps. Once the cable current is known, the power dissipated in the cable can be calculated as follows:

$$P_{CAB} = I^2 R \quad (3)$$

$$(0.081^2)(9.4)$$

$$P_{CAB} = 0.062 \, W$$

The values in Tables 2-4 were calculated in the same manner as the example above.

Table 3 shows power loss data for a 26 AWG cable having 15.40 ohms of resistance.

TABLE 3

Cable losses as a Function of Length and Power for 24 AWG Cable

| Class of PD | Current | Loss | Loss as a Percentage of PD Load |
|---|---|---|---|
| Class 1 = 3.84 W | 82 mA | 0.104 W | 2.7% |
| Class 2 = 6.49 W | 142 mA | 0.311 W | 4.8% |
| Class 3 = 12.95 W | 298 mA | 1.370 W | 10.6% |
| Undefined Class with 20.0 W load | 495 mA | 3.770 W | 18.9% |

Table 4 shows power loss data for a cable having 23.86 ohms of resistance, the maximum resistance of the cable and connectors as implied by the IEEE 802.3af standard.

TABLE 4

Cable losses as a Function of Length and Power for a Cable having 23.86 Ohms of Resistance

| Class of PD | Current | Loss | Loss as a Percentage of PD Load |
|---|---|---|---|
| Class 1 = 3.84 W | 83 mA | 0.164 W | 4.3% |
| Class 2 = 6.49 W | 146 mA | 0.509 W | 7.8% |
| Class 3 = 12.95 W | 321 mA | 2.459 W | 19.0% |
| Undefined Class with 20.0 W load | 912 ma | 19.85 W | 99.2% |

As demonstrated by Tables 2-4 power loss due to cable resistance increases greatly (proportionally to $I^2R$) with the amount of power required by each class of device. PSE 102 may more efficiently manage power allocation to each PD 104 by determining the length of each cable 106, 108, and 110 and the expected power loss due to cable length.

In one exemplary embodiment, PSE 102 can determine the length of a cable based on a cable length measurement obtained from a PHY chip equalizer. For example, network interfaces 112 of PSE 102 may include equalizers. The equalizer on each network interface compensates for the frequency-dependent attenuation in the cable by applying an inverse transfer function of the cable attenuation in varying degrees until the frequency spectrum matches the transmitted value. Some PHY chips, such as the BROADCOM® BCM5228 10/100BASE-TX Octal-PHY™ transceiver available from Broadcom Corporation of Irvine, Calif., U.S.A., include an equalizer cable length register that allows direct reading of cable length in 20-meter increments from 20 meters to 140 meters. Power management application 120 may determine cable length by reading the equalizer cable length register, if such a register is available.

In yet another alternate implementation, power management application 120 may determine cable length based on input from a user. For example, PSE 102 may include a configuration interface that allows a user to specify the length of cable being connected to each network interface 118. Power management application 120 may use the length input by the user in combination with PD device class to determine power to reserve for each interface. In yet another alternate implementation, cable length may be determined automatically by having PSE send a signal along the cable, detect a reflection of the signal, and determine cable length based on the transit time of the signal. An exemplary device that may be used to measure the length of a cable based on the transit time of the signal is a time domain reflectometer (TDR). However, while this is one possible way for measuring cable length, it would be more cost-effective to have the user input the cable length at the time the cable is connected to the power source equipment or to have the power source equipment read the equalizer cable length register.

Based on the anticipated power consumption of each PD 104 and one or more cable characteristics, PSE 102 can determine an amount of power to allocate to each PD 104. In one exemplary implementation, power management application 120 may calculate cable current using Equation 2. Then power management application 120 may calculate cable power dissipation using Equation 3. Power management application 120 may then calculate the power to allocate to each device using Equation 1. In order to solve Equation 2, power management application may assume that the voltage at the power source equipment is 48 volts, corresponding to the PSE voltage specified by the 802.3af standard. The resistance of each cable may be input by the user or measured by the power management application. Accordingly, the power allocated to each device may be determined on-the-fly when the device is attached to power source equipment 102.

In an alternate implementation, rather than calculating power to be allocated on-the-fly, power management application 120 may access a table that stores pre-calculated power allocation data. For example, as illustrated above in FIG. 1, power source equipment 102 may include a table 122 that stores pre-calculated power allocation data. The power allocation data may be determined using Equations 1-3 above for different cable lengths and resistances. Table 122 may also store device class power consumption. Power management application 120 may use such a table to determine the power to allocate to each powered device 104, rather than performing the above-described calculations each time a device is connected to power source equipment 102.

Figure 2:
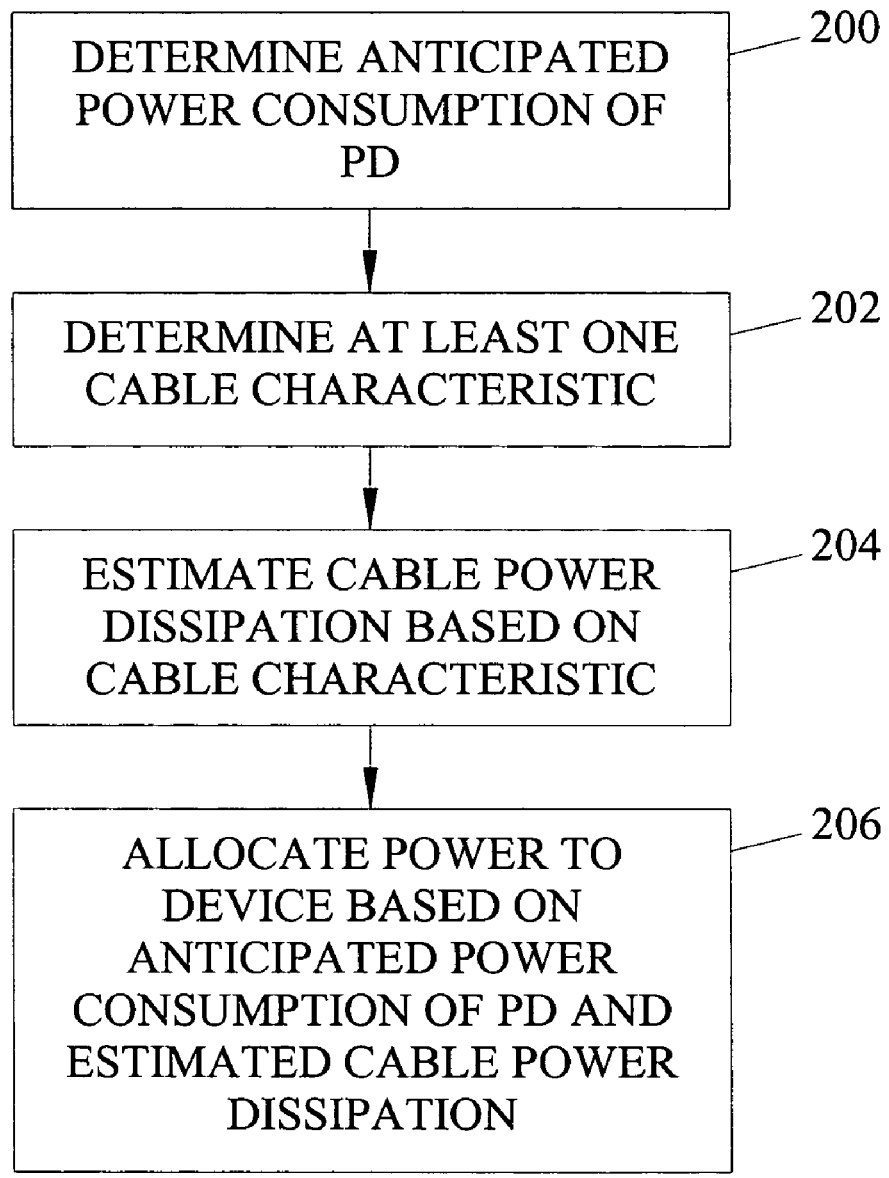
FIG. 2 is a flow chart of an exemplary process for managing power allocation from power source equipment to a device powered over a communications cable according to an embodiment of the subject matter described herein.

FIG. 2 is a flow chart illustrating exemplary steps for allocating power from power source equipment to a powered device based on a cable characteristic according to an embodiment of the subject matter described herein. Referring to FIG. 2, in step 200, power source equipment 102 determines the anticipated power consumption of the powered device. As stated above, this step may be determined by first determining the class of the powered device. Once the class is determined, the anticipated consumption may be determined to be the 802.3af maximum power consumption or other specified power consumption for the class or type of device. The power consumption may be determined by performing a lookup in table 122 using the device class or type as a lookup key. Alternatively, or addition, PSE 102 and the powered device may communicate with each other using SNMP or other protocol to determine actual power consumption of the powered device.

In step 202, PSE 102 determines a cable characteristic. As stated above, the cable characteristic may be any characteristic that affects power dissipation or transmission in the cable that connects PSE 102 to a PD 104. In one exemplary implementation, the cable characteristic may include cable length and resistance per unit length. In step 204, power source equipment 102 estimates cable power dissipation based on the cable physical characteristic. This step may be performed by having power management application 120 calculate the actual cable power dissipation using Equations 1-3 above. Alternatively, step 204 may be performed by performing a lookup in table 122. In step 208, PSE 102 allocates power to the cable based on anticipated power consumption of the powered device and estimated power dissipation.

Thus, using the steps illustrated in FIG. 2, power can be efficiently allocated to powered devices. As a result, power source equipment 102 can power more powered devices than conventional power source equipment that allocates power based on worst-case power dissipation according to the 802.3af standard.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing power allocation to a device powered over a communications cable, the method comprising:
    (a) connecting a powered device to power source equipment via a communications cable;
    (b) determining anticipated power consumption of the powered device;
    (c) determining at least one characteristic of the cable, wherein determining at least one characteristic of the cable includes determining a length of the cable based on length read from an equalizer cable length register associated with an equalizer implemented in a physical layer chip of a network interface in the power source equipment; and
    (d) allocating an amount of power at the power source equipment to the powered device based on the anticipated power consumption and the cable characteristic.

2. The method of claim 1 wherein connecting a powered device to power source equipment via a communications cable includes connecting a device selected from the group consisting of a switch, a hub, a router, a bridge, and a repeater to the power source equipment via the communications cable.

3. The method of claim 1 wherein connecting a powered device to the power source equipment via a communications cable includes connecting a powered device to the power source equipment via an Ethernet cable.

4. The method of claim 1 wherein determining anticipated power consumption of the powered device includes determining a class of the powered device and determining the anticipated power consumption based on the class.

5. The method of claim 4 wherein determining the class of the powered device includes determining an 802.3af class of the powered device.

6. The method of claim 5 wherein allocating an amount of power at the power source equipment to the powered device includes allocating an amount of power based on the characteristic and power consumption specified for the 802.3af class of the powered device.

7. The method of claim 1 wherein determining anticipated power consumption of the powered device includes exchanging messages with the powered device over the cable to determine the anticipated power consumption.

8. The method of claim 1 wherein allocating a predetermined amount of power includes:
    (a) estimating cable power dissipation in the cable based on the cable length;
    (b) adding the estimated cable power dissipation to the anticipated power consumption of the powered device to produce a sum; and
    (c) allocating power to the powered device based on the sum.

9. The method of claim 1 wherein determining anticipated power consumption of the powered device includes performing a first lookup in a table based on device class and wherein allocating an amount of power at the power source equipment to the powered device includes performing a second lookup in the table based on the cable physical characteristic to determine an additional amount of power to be allocated to the powered device.

10. The method of claim 1 wherein the cable characteristic includes the length of the cable and a resistance per unit length of the cable.

11. The method of claim 1 wherein the cable characteristic includes the length of the cable, a resistance per unit length of the cable, and a temperature of the cable.

12. The method of claim 1 comprising repeating steps (a)-(d) to connect a plurality of powered devices connected to the power source equipment via a plurality of different communications cables, determining at least one a characteristic of each of the cables, and allocating power to each device based on the characteristics of the respective cables.

13. The method of claim 12 wherein the plurality of devices comprise 802.3af devices of the same class and wherein allocating power to each device includes allocating different amounts of power to at least some of the devices based on the cable characteristics.

14. The method of claim 1 wherein the powered device and the power source equipment comprise power over Ethernet (PoE) devices.

15. A system for managing power allocation to a device powered over a communications cable, the system comprising:
   a. a network interface for connecting to a powered device via a communications cable;
   b. a power source for providing power to the powered device via the network interface and the communications cable;
   c. a power management application located in power source equipment (PSE) for determining an anticipated power consumption of the powered device and at least one characteristic associated with the cable and for allocating an amount of power to the powered device based on the anticipated power consumption and the characteristic; and
   (d) a memory located in the PSE and storing a table, wherein the table stores pre-calculated power dissipation values for different cable lengths and resistances and wherein the power management application is adapted to determine the amount of power to be allocated by accessing one of the pre-calculated power dissipation values in the table.

16. The system of claim 15 wherein the network interface, the power source, and the power management application are components of a device selected from the group consisting of a switch, a hub, a router, a bridge, and a repeated.

17. The system of claim 15 wherein the network interface comprises an Ethernet interface.

18. The system of claim 15 wherein the power management application is adapted to determine a class of the powered device and to determine the anticipated power consumption based on the class.

19. The system of claim 18 wherein the class comprises an 802.3af class.

20. The system of claim 19 wherein the power management application is adapted to allocate an amount of power to the powered device based on power consumption specified for the 802.3af class of the powered device.

21. The system of claim 15 wherein the power management application is adapted to determine a length of the cable and to calculate anticipated power dissipation of the cable based on the cable length.

22. The system of claim 21 wherein the power management application is adapted to read an equalizer cable length register implemented in a physical layer chip associated with a network interface to determine the length of the cable.

23. The system of claim 21 wherein the power management application is adapted to receive input from a user regarding the length of the cable.

24. The system of claim 21 wherein the power management application is adapted to transmit a signal over the cable to determine the length of the cable.

25. The system of claim 15 wherein the cable characteristic includes cable length and resistance per unit length.

26. The system of claim 15 wherein the cable characteristic includes cable length, resistance per unit length, and temperature.

27. The system of claim 15 comprising a plurality of network interfaces for connecting to a plurality of different powered devices via a plurality of different cables, wherein the power management application is adapted to calculate cable power loss for each device based on individual cable lengths connecting each device to its associated network interface.

28. The system of claim 27 wherein the power management application is adapted to allocate different power levels to devices of the same 802.3af class based on cable lengths associated with each device.

29. The system of claim 15 wherein the network interface, the power source, and the power management application are components of power over Ethernet (PoE) power source equipment (PSE).

30. A computer program product comprising computer executable instructions embodied in a computer readable medium for performing steps comprising:
   a. determining anticipated power consumption of a powered device for connecting to power source equipment via a communications cable and receiving power from the power source equipment via the communications cable;
   b. determining a characteristic of the cable, wherein determining at least one characteristic of the cable includes determining a length of the cable based on length read from an equalizer cable length register associated with an equalizer implemented in a physical layer chip of a network interface in the power source equipment; and
   c. based on the power consumption and the characteristic, allocating an amount of power at power source equipment for powering the powered device.

31. The computer program product of claim 30 wherein determining anticipated power consumption of the powered device includes determining a class of the powered device.

32. The computer program product of claim 31 wherein determining a class of the powered device includes determining an 802.3af class of the powered device.

33. The computer program product of claim 32 wherein allocating an amount of power at the power source equipment includes allocating the amount of power based on power consumption specified for the 802.3af class of the powered device and the characteristic.

34. The computer program product of claim 30 wherein allocating an amount of power includes calculating power dissipation of the cable based on the length.

35. The method of claim 1 comprising storing pre-calculated power allocation data including power dissipated in the cable for different cable lengths and wherein allocating an amount of power includes accessing the table using the cable length.

36. The computer program product of claim 30 comprising storing pre-calculated power allocation data including power dissipated in the cable for different cable lengths and wherein allocating an amount of power includes accessing the table using the cable length.

* * * * *